United States Patent [19]
Williams

[11] Patent Number: 6,083,093
[45] Date of Patent: Jul. 4, 2000

[54] APPARATUS AND PROCESS FOR HANDLING STRANDS OF MEAT PRODUCT LINKS

[76] Inventor: Roger S. Williams, 1777 Bethel, New Richmond, Ohio 45157

[21] Appl. No.: 08/959,689

[22] Filed: Oct. 29, 1997

[51] Int. Cl.$^7$ .................................................. A22C 15/00
[52] U.S. Cl. ............................................. 452/51; 452/182
[58] Field of Search .............................. 452/51, 182, 183

[56] References Cited

U.S. PATENT DOCUMENTS

| | | | |
|---|---|---|---|
| 1,033,154 | 7/1912 | Collins | 452/51 |
| 3,264,679 | 8/1966 | Moekle | 452/51 |
| 4,218,003 | 8/1980 | Plewa et al. | 452/51 |
| 4,880,105 | 11/1989 | Kasai et al. | 452/51 |
| 5,057,055 | 10/1991 | Michaud et al. | 452/182 |
| 5,073,142 | 12/1991 | Kasai et al. | 452/51 |
| 5,102,368 | 4/1992 | Strasser et al. | 452/51 |
| 5,163,864 | 11/1992 | Burger et al. | 452/51 |

*Primary Examiner*—Willis Little

[57] ABSTRACT

An apparatus and process for handling strands of meat product links, the apparatus utilizing a strand flow forward end movement control apparatus in combination with a sausage stuffing machine which halts forward strand flow and allows the balance of the strand to collect in a nearby receptacle. Strands are continuously connected to each other and moved to a loop forming apparatus having a rotatable wheel formed from a pair of side plates to configure a link strand receiving channel. Catch rods are positioned on the side plates and are operable selectively in combination with a camming device to actuate the catch rods and release the strand for engagement with the hangers. As the strands are released for hanger engagement, they are looped over each individual hanger in loops of controllable size.

12 Claims, 9 Drawing Sheets

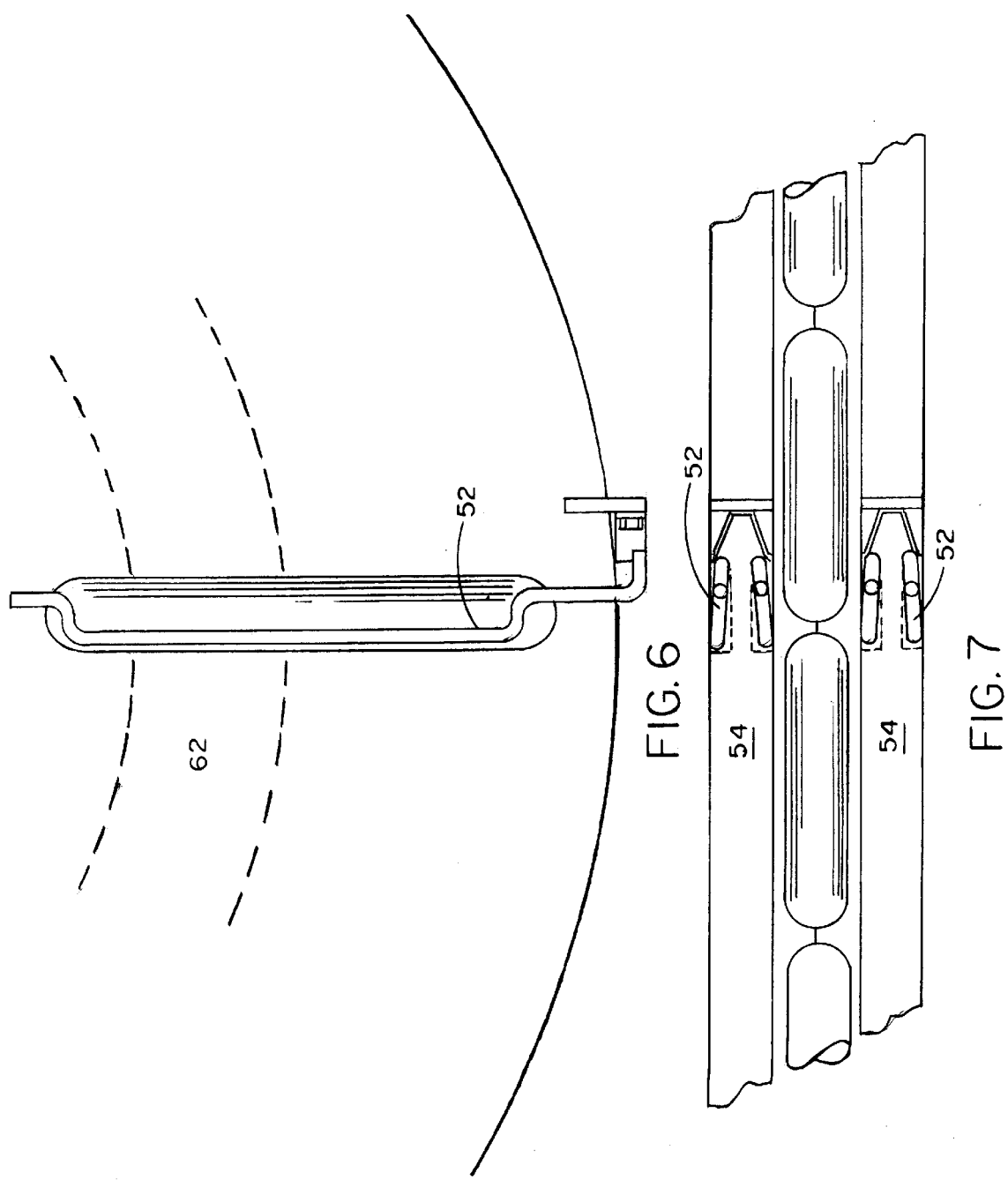

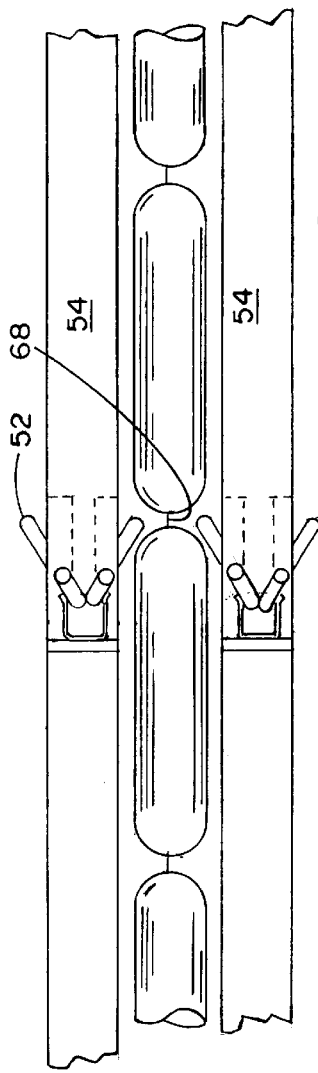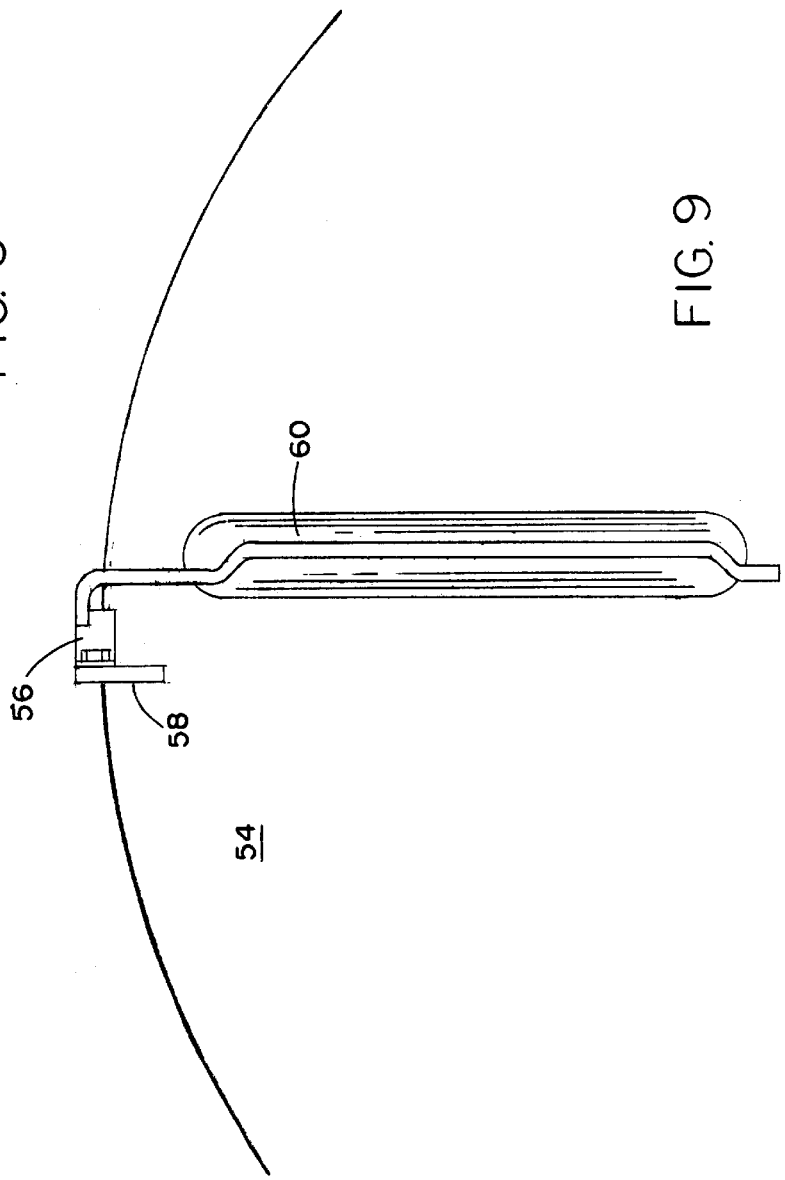

APPARATUS AND PROCESS FOR HANDLING STRANDS OF MEAT PRODUCT LINKS

BACKGROUND OF THE INVENTION

1. Field of the Invention

This invention relates to improvements in a machine and method for handling strands of joined sausage links and more particularly to improvements in the mechanism for loading link strands onto moving hangers for subsequent flavoring and cooking and to terminate strand flow forward end movement selectively and induce the flow of the balance of the strand coming from the output of a link stuffing machine into a nearby receptacle.

2. Description of the Prior Art

Linked meat products like sausages are usually produced in long strands or chains of joined links. Frequently, such products are smoked after being formed. When the products, hereinafter referred to as sausages for convenience, are to be treated in that manner, the sausage strand is formed into a series of loops over hangers as the strand leaves the sausage stuffing machine. After the sausage loops are formed, they are manually removed from the loop forming device and transported into a smoking chamber or oven.

There are a number of prior art loop-forming machines, particularly adapted for use with sausage chains to form loops as the sausage leaves the stuffing machine. See U.S. Pat. No. 3,191,222 issued Jun. 29, 1965. Here the linked sausage chain is arranged in a series of loops on an endless conveyor immediately upon discharge from a sausage stuffing machine. In this instance, substantial difficulty is encountered in adjusting the loop forming machine when individual linked sausage loop length is changed. The machine is also complex and expensive, both in construction and operation.

Another sausage loop forming machine is disclosed in U.S. Pat. No. 4,218,003 issued Aug. 19, 1990. In this case, a rotating wheel feeder mechanism cooperates with a conveyor and sensor to supply continuously a link sausage strand or chain to the conveyor's hooks.

While prior art devices for handling formed loops of sausage have been used acceptably, they are expensive, complex and do not enable an efficient increase in production as is currently needed. Moreover, they do not permit an automatic or immediate adjustment in machine operation to accommodate links of varying size. It is to this current need that the present invention is directed.

SUMMARY OF THE INVENTION

The present invention includes the utilization of a sausage strand accumulation apparatus positioned at the output of a sausage stuffing machine which can be selectively used to prevent forward movement of connected sausage link strands so they can be collected individually. The improvement includes a sausage horn having a section to receive linked sausages directly from the sausage stuffing machine, stop forward flow and cause them to collect in a nearby receptacle. These receptacles are then taken to a sausage connecting station where separate strands of sausage are tied to each other to form a continuous strand for movement through the system.

After joining strands, the joined continuous strand is moved to a plurality of moving hangers for movement to a remote location for cooking and flavoring. In moving these strands to the hangers, a plurality of rotary loading devices are employed, each engaging and moving a connected strand and looping it over the hangers in a manner to maximize exposure of the strand links when subjected to subsequent cooking and flavoring treatment.

The rotary loading devices constitute a loop forming apparatus for use with the hangers, and each includes a rotatable wheel having a pair of side plates which form a link strand receiving channel. Catch rods are positioned on the wheel side plates and are operable to engage and secure the link strand for movement with the wheel. A camming device selectively actuates the catch rods with respect to the strand and releases the strand for precise engagement with the hangers.

The invention also includes a novel process for handling the link strands and link strand loops in the manner described.

From the foregoing brief summary, it will be evident that one objective of the present invention is to provide an improvement for conventional sausage handling and treatment that has all of the benefits of prior systems and more and none of the disadvantages.

Another objective of the present invention is to provide improved apparatus of simple construction which may be readily adjusted to change the size of sausage link strand loops without delay or major modification.

A further object of the present invention is to provide an improved device for handling sausage link strands and link strand loops that is easy to service and clean.

Yet another objective of the present invention is to provide improvements in strand flow and strand loop formation that will reduce manufacturing costs associated with manual product handling.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this device.

It is important that the claims be regarded as including such equivalent methods and products resulting therefrom that do not depart from the spirit and scope of the present invention and to define the invention of the application, which is measured by its claims, nor to limit its scope in any way.

Thus, the objects of the invention set forth above, along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

BRIEF DESCRIPTION OF THE DRAWINGS

FIG. 6 is a side elevational, schematic, enlarged and fragmentary view of one catch rod in the open non-drive mode positioned for movement within an opening in a rotatable wheel side plate;

FIG. 7 is a plan, schematic, enlarged and fragmentary view of two pairs of catch rods associated with the side plates, one catch rod of each pair being withdrawn from engagement with a link by a cam;

FIG. 8 is a plan, schematic, enlarged and fragmentary view of the two catch rod pairs shown in FIG. 7 without the presence of the cam and in the drive position;

FIG. 9 is a side elevational, schematic, enlarged and fragmentary view of a portion of a side plate carrying one catch rod in the drive position which extends within a slot in the side plate;

DESCRIPTION OF THE PREFERRED EMBODIMENT

Figure 1:
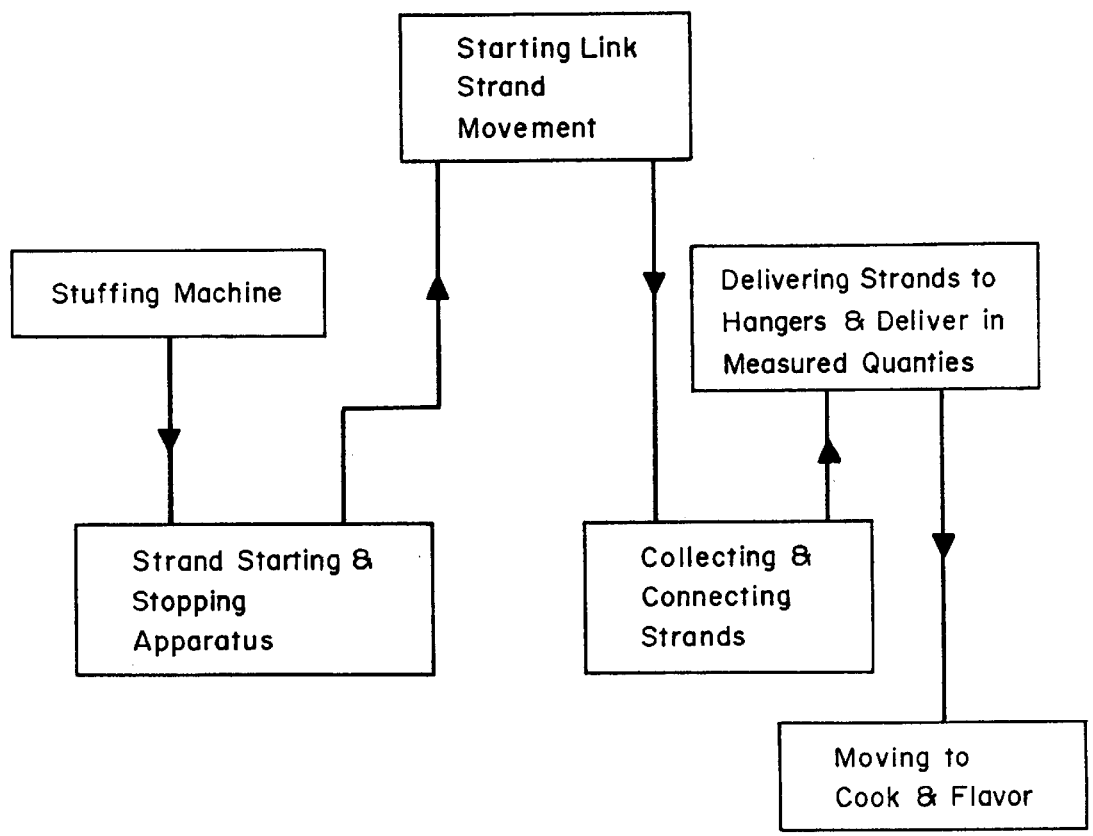
FIG. 1 is a block diagram illustrating the equipment stations and the process used in applying the present invention.
Figure 2:
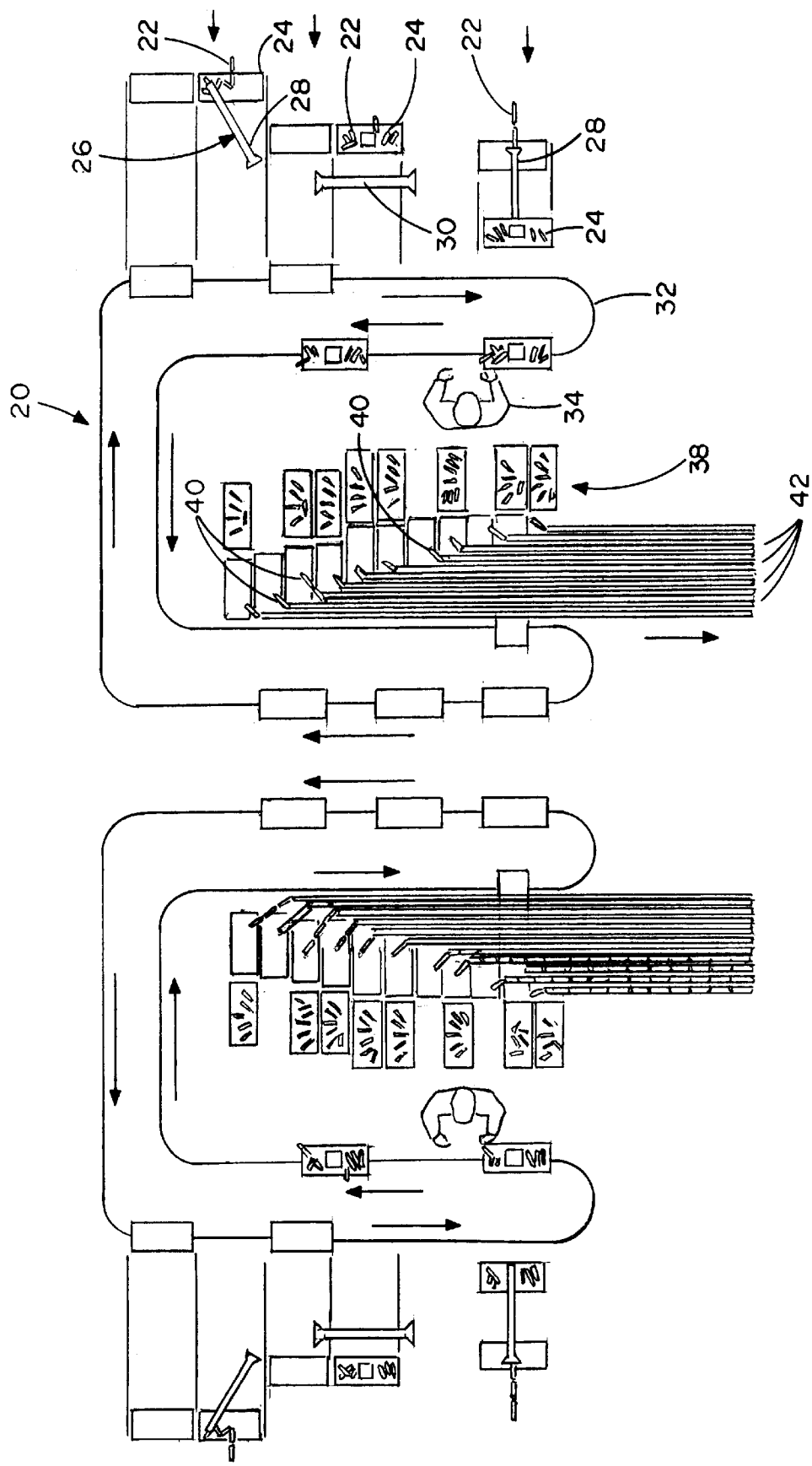
FIG. 2 is a plan view of two work stations employing the apparatus and process of the present invention.

Referring now to the drawings and particularly to FIG. 2, the apparatus and process for handling strands of meat product links, shown generally as 20, is used in combination with a link stuffing machine (not shown), the usual product line of which is a strand of connected sausage links produced in a conventional manner. A strand 22 of connected links is received from the stuffing machine where it is temporarily accumulated in a receptacle 24 until ready for movement through the system. A link strand accumulation apparatus 26 includes a link receiving section 28 and a support 30 for maintaining section 26 in moveable strand flow controlling relationship with respect to the stuffing machine. Suitable conventional means (not shown) is used for moving the link receiving section 28 to and away from the stuffing machine to selectively terminate the movement of the beginning of link strand 22 so that the strand can be collected in receptacle 24.

When a filled receptacle 24 is completely loaded and ready for further processing, it is secured to a conveyor 32 where it travels (see arrows) to an operator 34 for subsequent handling. One end 36 of strand 22 is engaged in a notch in receptacle 24, thus providing operator 34 easy access to a free end 36. Operator 34 turns and positions filled receptacle 24 at another location shown generally as 38 where he ties free end 36 to the trailing end 40 of another strand 22 already in the system.

Accumulating apparatus 26 rotates horizontally about support 30 so that it can catch strand forward end flow from the stuffing machine and cause the strand to flow into receptacle 24. It then can be moved 90° to enable receptacle 24 to be removed and positioned on conveyor 32. Receiving section 28 of apparatus 26 merely receives the forward end of strand 22 and holds it until receptacle 24 is filled and free end 36 can be secured in the receptacle slot. This permits receptacle 24 to be unattended during filling. The stuffing machine is programmed to dispense a predetermined number of connected links forming a strand, and when that amount is received in receptacle 24, the receptacle is moved to conveyor 32.

When receptacles 24 are moved to location 38 and tied as previously described to connect end 36 to trailing strand end 40, receptacles 24 are emptied as each contained strand is dispensed therefrom, and a new filled receptacle 24 is positioned in its place. The process continues with a plurality of strands, 12 in the example shown, constantly moved forward in the direction shown (see arrow).

Figure 4:
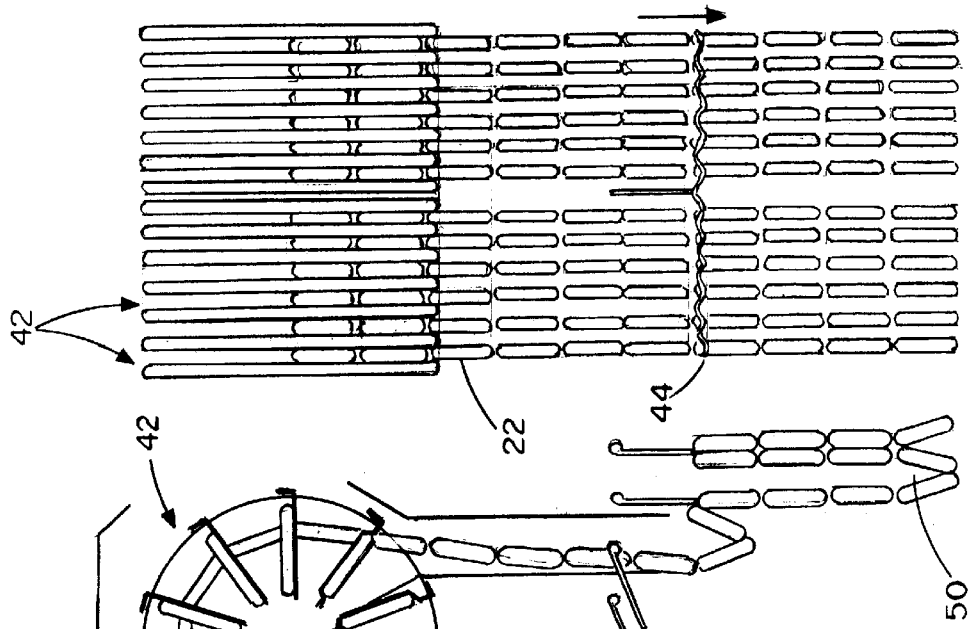
FIG. 4 is a plan schematic view illustrating a plurality of rotatable wheels driving a plurality of link strands to engage one moving hanger for movement of the strands to the cooking and flavoring stations.
Figure 3:
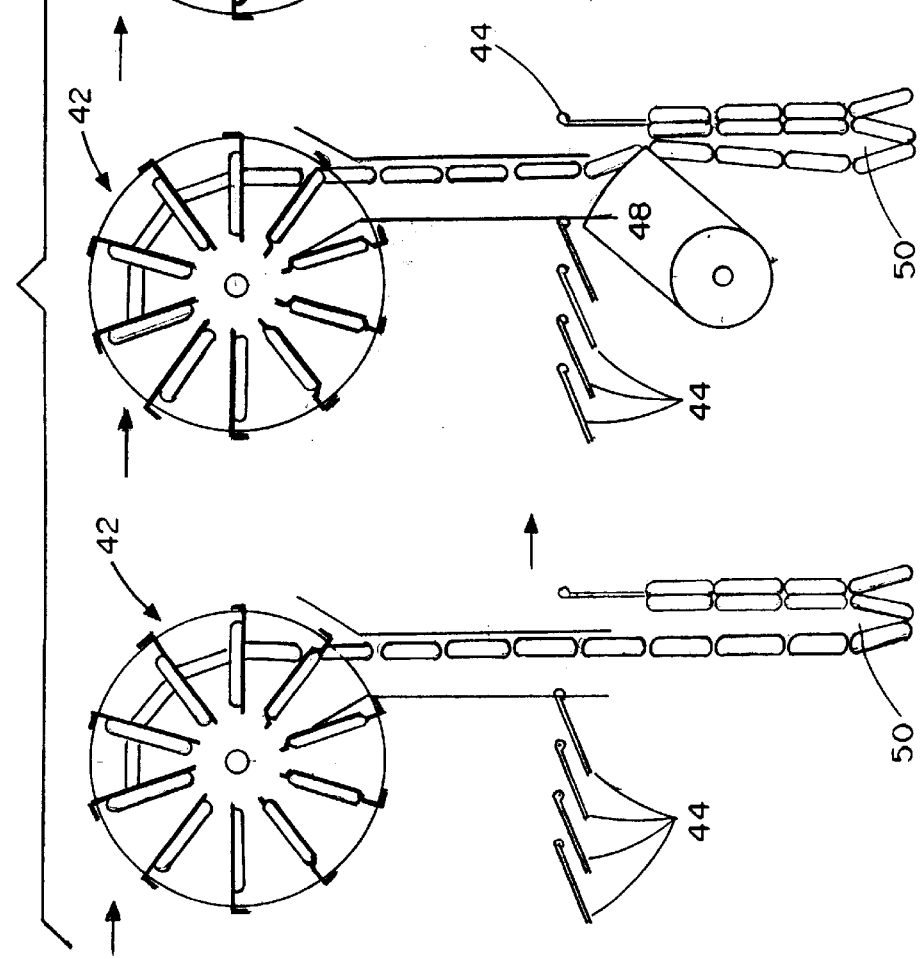
FIG. 3 is a side elevational, schematic sequential operational view of the rotatable wheel depositing a moving strand over a plurality of moving hangers so that the strand is looped over each individual hanger.

Strands 22 are moved in unison (FIG. 4) by a plurality of rotatable wheels 42. The wheels rotate in a clockwise direction (FIG. 3), and each wheel 42 drives its carried strand 22 through a portion of its periphery in the manner shown. At a position of approximately 4 o'clock, the strand drive mechanism subsequently to be described is released so that strand 22 is freed and moves directly downwardly from the pull of gravity. As strand 22 descends, it engages sequentially a plurality of hangers 44 configured in a T-shape arrangement with a plurality of grooves 45 cooperatively receiving a total of 12 strands as shown in FIG. 4.

A convenient displacing mechanism 48 displaces each hanger 44 as it moves with a supporting moving conveyor (not shown) to shift preceding hanger 44 slightly forward, thus allowing strand 22 to conveniently loop over hanger 44 and form a loop 50. This looping formation is a continuous one so that a endless stream of loops 50 are formed and carried by hangers 44 moving on the conveyor to a remote location for smoking and/or cooking.

The drive mechanism for holding strands 22 on rotatable wheels 42 includes a plurality of catch rods 52 mounted on the periphery of side plates 54 as shown in FIGS. 6 and 9. Each catch rod 52 is supported by a spring 56 and a spring mount 58, and catch rod 52 is configured to be movably displaceable in and out of a slot 60 formed in side plate 54.

Figure 5:
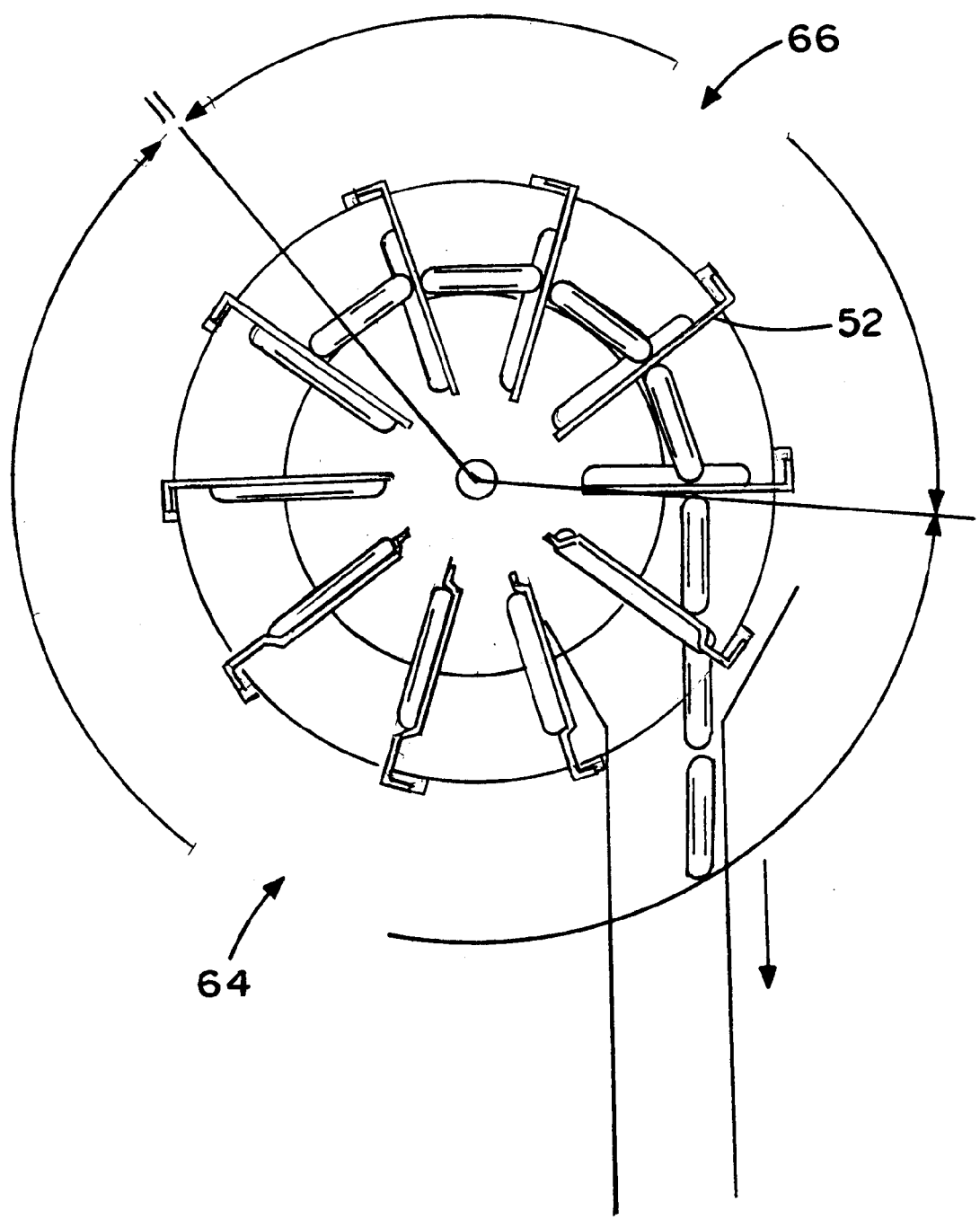
FIG. 5 is a side elevational, schematic view of the rotatable wheel showing the catch rod drive position and the catch rod open or non-drive position during one rotation.
Figure 10:
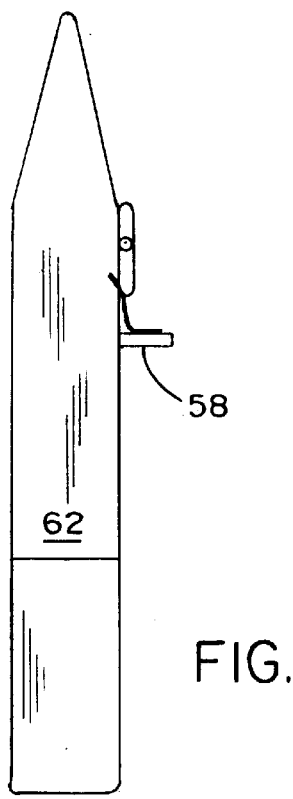
FIG. 10 is an end elevational, schematic and enlarged view of the cam used to actuate the catch rods carried by the side plates.
Figure 14:
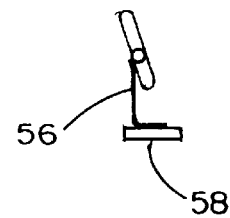
FIG. 14 is a side elevational, isolated view of a catch rod supported by a spring and spring mount.
Figure 11:
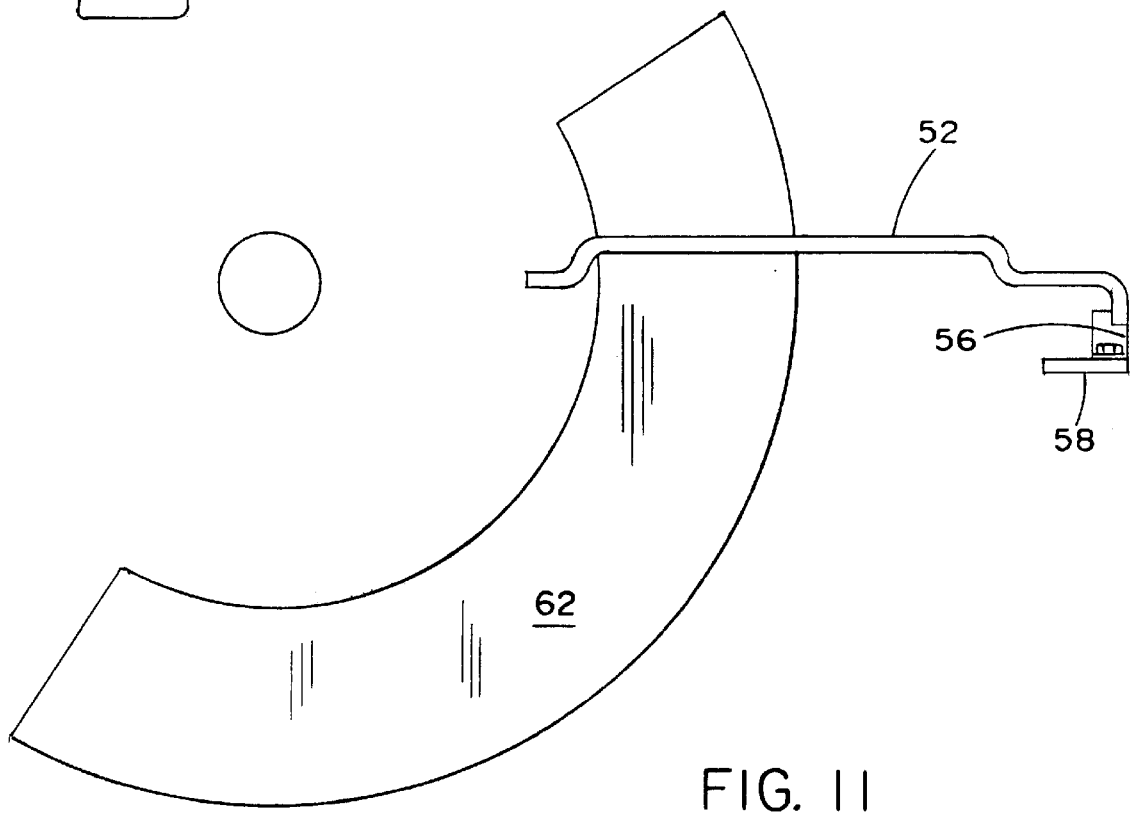
FIG. 11 is a side elevational, schematic and enlarged view of the cam and catch rod engaged thereby.
Figure 12:
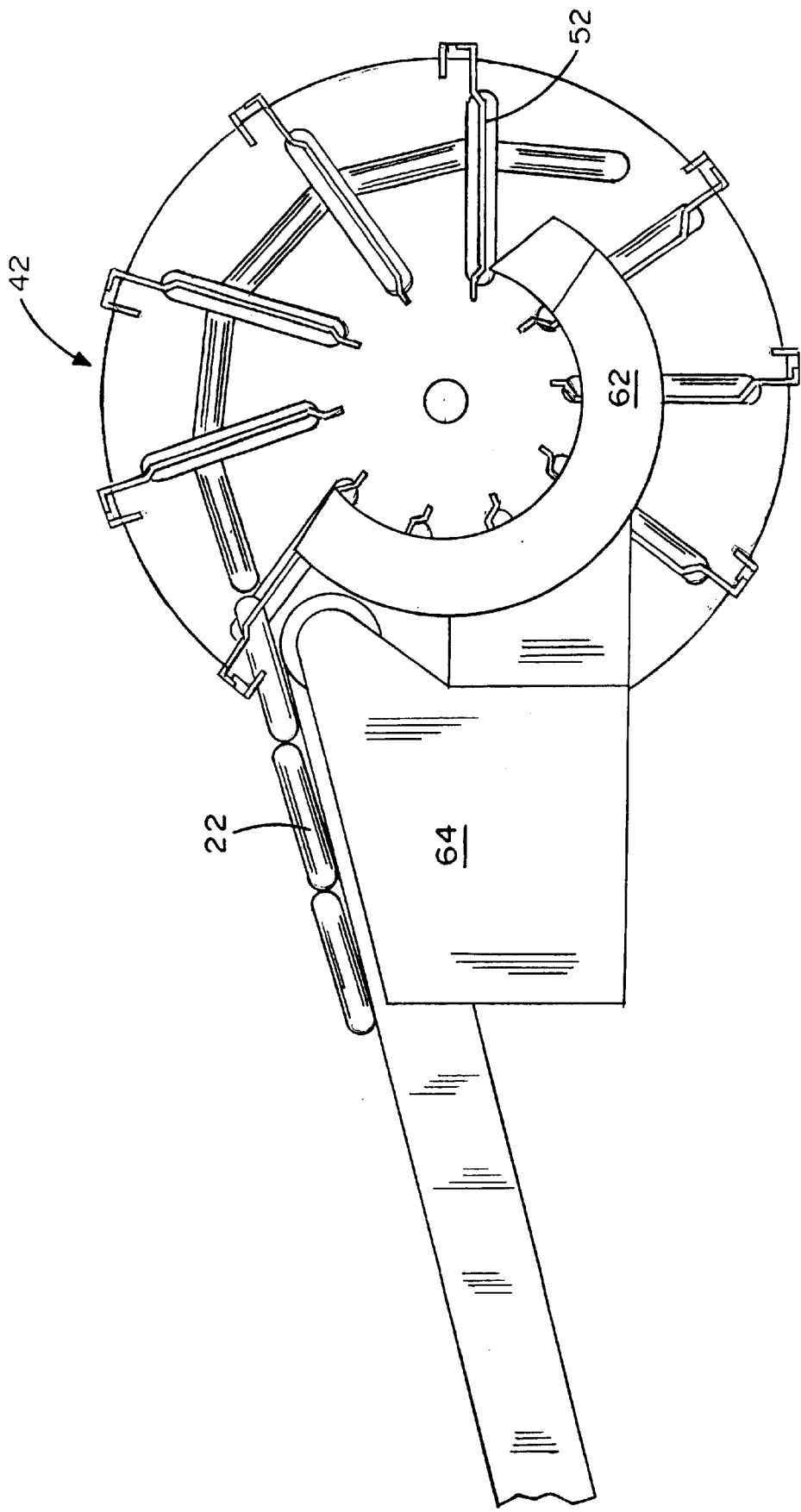
FIG. 12 is a side elevational, schematic and fragmentary view of the rotatable wheel carrying a strand of sausage links with a portion of the catch rods on the wheel side plates engaging and driving the strand and another portion of the catch rods on the wheel side plates in the open non-drive position to release the strand.
Figure 13:
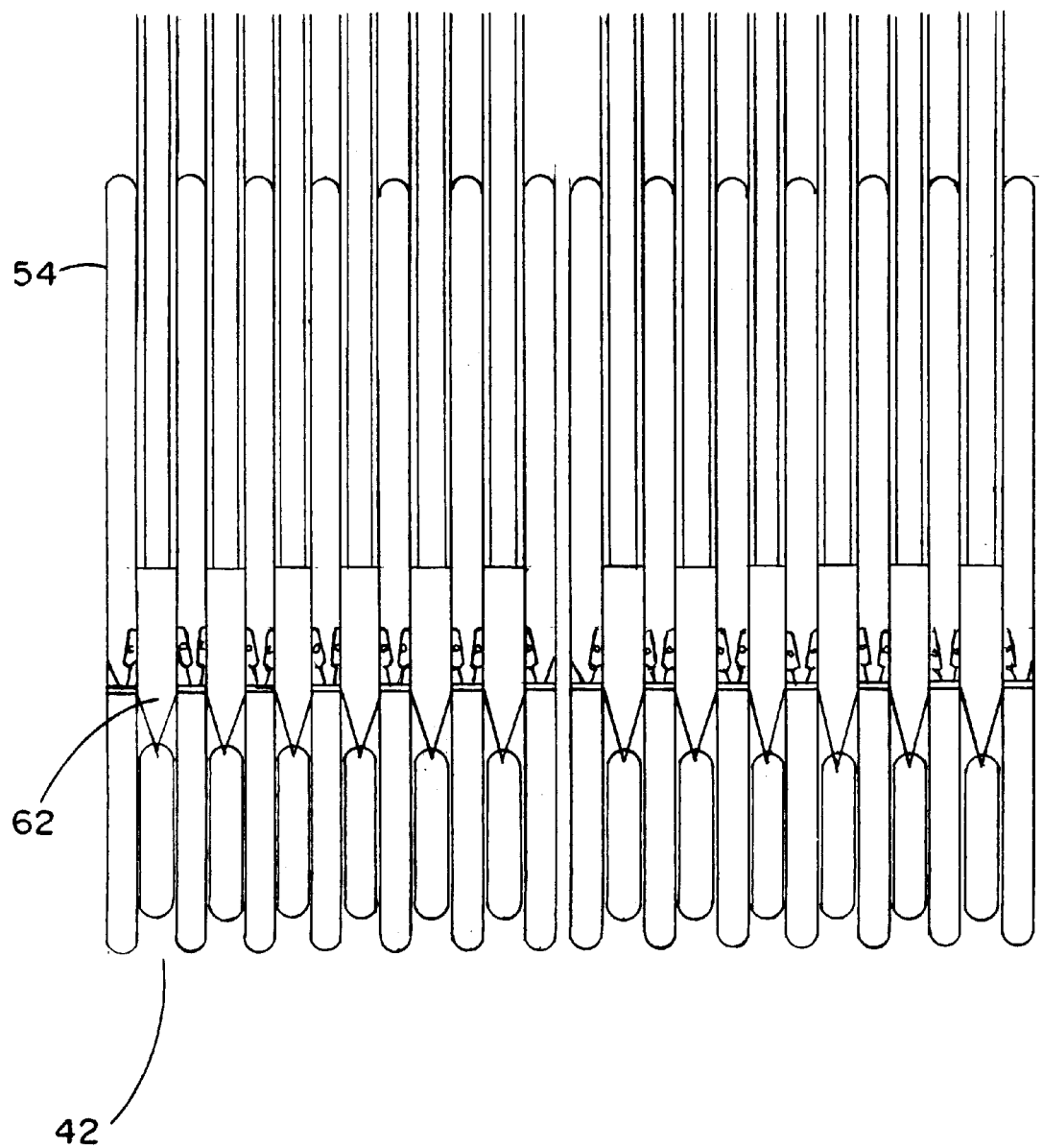
FIG. 13 is a plan, schematic view of a plurality of rotatable wheels in a side-by-side relationship driving a plurality of meat product link strands wherein the wheels carry pairs of catch rods which are engaged selectively by stationary cams.

A stationary cam 62 is rigidly secured by a stationary supporting member 64 as shown in FIG. 12. Cam 62 is positioned to displace catch rods 52 and thereby disengage them from strand 22 as shown in FIGS. 6 and 7. This catch rod open position shown generally as 64 is broadly illustrated in FIG. 5. The catch rod drive position shown generally as 66 has catch rods 52 engaging strand 22 at the connecting locations 68 between links. Thus, cam 62 extending throughout non-driving location 64, engages catch rods 52 and displaces them through slots 60 thereby causing catch rods 52 to be recessed within the thickness of side plates 54 as shown in FIG. 7.

The size of the formed loops 50 can be varied by adjusting the speeds of strand movement through rotatable wheels 42 and the conveyor carrying hangers 44 supporting a plurality of strands 22 to form loops 50. The calibration and coordination of the movement of link strands 22 toward hangers 44 with the delivery of strands 42 to hangers 44 can result in appropriate adjustment for loop size and consistent loop formation.

The process of the present invention of feeding and configuring a predetermined link strand 22 and transporting the strand to another location for cooking and flavoring utilizes the steps of directing the strand flow from the stuffing machine to link strand accumulating apparatus 26 like that described previously, selectively actuating apparatus 26 to stop link strand forward movement and collect link strand 22 in a predetermined configuration so that trailing end 40 of strand 22 is positioned near free end 36 of collected strand 22. Strands 22 are connected at this location and are moved to a hanger assembly where they are delivered to hangers 44 sequentially to configure strands 22 consistently and in measured quantities with respect to each hanger 44. The configured strands on hangers 44 are then transported to another location for cooking and flavoring. In the process, the movement of connected strands 22 to hangers 44 can be calibrated with the delivery of connected strands 22 to hangers 44 to change the size and consistency of formed loops 50.

Although there has been illustrated and described specific embodiments of the present invention, it is to be clearly understood that these were merely for the purpose of illustration, and that changes and modifications may readily be made therein by those skilled in the art without departing from the spirit and scope of the invention.

What is claimed is:

1. Improvement in a handling machine for use with a strand of connected meat product links, the machine receiving a strand of connected links from the output of a sausage stuffing machine and thereafter transporting the strand to hangers for subsequent cooking and flavoring, the improvement comprising: a loop forming apparatus for use with the hangers having wheel side plates forming a link strand receiving channel; means driving the rotatable wheel, at least one catch rod secured to the side plate and operable to engage and secure the link strand for movement with the wheel, and means to selectively actuate the catch rod with respect to the strand and release the strand for engagement with the hangers.

2. Improvement for use with a strand of connected meat product links, the machine receiving a strand of connected links from the output of a sausage stuffing machine and thereafter transporting the strand to hangers for subsequent cooking and flavoring, the improvement comprising: a link strand accumulation apparatus including a link receiving section, support means for maintaining the section in a moveable strand flow controlling relationship with respect to the sausage stuffing machine; and means for moving the link receiving station to and away from the stuffing machine to selectively terminate link strand forward end movement and induce the flow of the link strand to a collecting means, the improvement further comprising: a loop forming apparatus for use with the hangers including a rotatable wheel having a pair of side plates forming a link strand receiving channel; means driving the rotatable wheel; at least one catch rod secured to the side plate and operable to engage and secure the link strand for movement with the wheel; and camming means to selectively actuate the catch rod with respect to the strand and release the strand for engagement with the hangers.

3. Apparatus for receiving and configuring a strand of connected meat product links of a predetermined length from a link stuffing machine and transporting the strand to another location for cooking and flavoring, the apparatus comprising: a link strand accumulation apparatus including a link receiving section; support means for maintaining the section in a moveable strand flow controlling relationship with respect to the sausage stuffing machine; means for moving the link receiving section to and away from the stuffing machine to selectively terminate link strand forward end movement and induce the flow of the link strand to a collecting means; a plurality of hangers for transporting the strand to another location; and a loop forming apparatus for use with the hangers including a rotatable wheel having a pair of side plates forming a link strand receiving channel means driving the rotatable wheel at least one catch rod secured to the side plate and operable to engage and secure the link strand for movement with the wheel and camming means to selectively actuate the catch rod with respect to the strand and release the strand for engagement with the hangers.

4. The apparatus as claimed in claim 3 further comprising: hanger displacement means for sequentially displacing each of the hangers to facilitate receipt and securement of the strand by the hangers.

5. The claim as claimed in claim 4 further comprising: a loop forming apparatus for use with the hangers including a rotatable wheel having a pair of side plates forming a link strand receiving channel; means driving the rotatable wheel; at least one catch rod secured to the side plate and operable to engage and secure the link strand for movement with the wheel; and camming means to selectively actuate the catch rod with respect to the strand and release the strand for engagement with the hangers.

6. The claim as claimed in claim 3 wherein the camming means includes at least one cam proximate the rotatable wheel and at least one catch drive rod, the cam selectively engageable with the catch drive rod to release the link strand for engagement with the hangers.

7. The claim as claimed in claim 6 further comprising: hanger displacement means for sequentially displacing each of the hangers to facilitate receipt and securement of the strand by the hangers.

8. The claim as claimed in claim 3 further comprising: means for calibrating and coordinating movement of the link strand toward the hangers with the delivery of the strand to the hangers in consistent and measured quantities.

9. The claim as claimed in claim 8 further comprising: hanger displacement means for sequentially displacing each of the hangers to facilitate receipt and securement of the strand by the hangers.

10. The claim as claimed in claim 9 wherein the camming means includes at least one cam proximate the rotatable wheel and at least one catch drive rod, the cam selectively engageable with the catch drive rod to release the link strand for engagement with the hangers.

11. A process for receiving and configuring a strand of connected links of a predetermined length from a link stuffing machine and transporting the strand to another location for cooking and flavoring, the process comprising the steps of: directing a strand flow from the stuffing machine to a link strand accumulation apparatus; selectively actuating the apparatus to terminate link strand forward end movement and induce the flow of the link strand to a collecting means; collecting the link strand in a predetermined configuration so that the trailing end of the strand is positioned proximate the leading end of the previous collected strand; connecting the trailing end of the collected strand to the leading end of the previous collected strand; moving the connected strands to a hanger assembly; delivering the connected strands to the hanger assembly sequentially to form loops and configure the strands consistently and in measured quantities with respect to the hanger assembly; and transporting the configured strands to another location for cooking and flavoring.

12. The process as claimed in claim 11 wherein the movement of the connected strands to the hanger assembly is calibrated with the delivery of connected strands to the hanger assembly to provide loops of varying sizes.

* * * * *